United States Patent [19]

Metzer et al.

[11] Patent Number: 5,106,232
[45] Date of Patent: Apr. 21, 1992

[54] METHOD OF IN SITU DECONTAMINATION

[75] Inventors: Nancy Metzer, Exton; Michael Corbin, Downingtown, both of Pa.

[73] Assignee: Roy F. Weston, Inc., West Chester, Pa.

[21] Appl. No.: 565,515

[22] Filed: Aug. 10, 1990

[51] Int. Cl.$^5$ .............................................. B09B 1/00
[52] U.S. Cl. .................................. 405/128; 405/258; 405/129
[58] Field of Search ............... 405/128, 129, 258, 131; 166/250, 305 D, 246; 210/610

[56] References Cited

U.S. PATENT DOCUMENTS

| | | |
|---|---|---|
| Re. 33,102 | 10/1989 | Visser et al. |
| 2,104,327 | 1/1938 | Kotzebue |
| 2,240,550 | 5/1941 | Conlon, Jr. |
| 2,365,428 | 12/1944 | Muskat |
| 2,765,850 | 10/1956 | Allen |
| 2,767,792 | 10/1956 | Spearow |
| 2,811,205 | 10/1957 | Spearow |
| 3,351,132 | 11/1967 | Dougan et al. |
| 3,735,815 | 5/1973 | Myers |
| 3,749,170 | 7/1973 | Riehl |
| 3,765,483 | 10/1973 | Vencil |
| 3,941,679 | 3/1976 | Smith et al. |
| 3,980,138 | 9/1976 | Knopik |
| 4,026,355 | 5/1977 | Johnson et al. |
| 4,167,973 | 9/1979 | Forte et al. |
| 4,222,611 | 9/1980 | Larson et al. |
| 4,288,174 | 9/1981 | Laws |
| 4,323,122 | 4/1982 | Knopik |
| 4,334,580 | 6/1982 | Vann |
| 4,401,569 | 8/1983 | Jhaveri et al. ............... 405/128 X |
| 4,469,176 | 9/1984 | Zison et al. ............... 405/129 X |
| 4,483,641 | 11/1984 | Stoll ............... 405/129 |
| 4,518,399 | 5/1985 | Croskell et al. ............... 405/129 X |
| 4,593,760 | 6/1986 | Visser et al. |
| 4,597,444 | 7/1986 | Hutchinson ............... 166/302 |
| 4,670,148 | 6/1987 | Schneider ............... 405/129 X |
| 4,745,850 | 5/1988 | Bastian et al. ............... 405/128 X |
| 4,765,902 | 8/1988 | Ely et al. ............... 405/128 X |
| 4,842,448 | 6/1989 | Koerner et al. ............... 405/131 X |
| 4,849,360 | 7/1989 | Norris et al. ............... 405/128 X |
| 4,982,788 | 1/1991 | Donnelly ............... 405/258 X |

OTHER PUBLICATIONS

Thornton et al, Venting for the Removal of Hydrocarbon Vapors From Gasoline Contaminataed Soil, J. Environ. Sci. Health, A17(1), 31–44 (1982).
API Pub. 4,429, Examination of Venting for Removal of Gasoline Vapors from Contaminated Soil, Mar. 1980.
EPA Handbook, Remedial Action at Waste Disposal Sites, Jun. 1982.
Gibb, Field Verification of Hazardous Waste Migration from Land Disposal Sites.
Constable et al, Gas Migration and Modeling.
Schwille, Migration of Organic Fluids Immiscible with Water in the Unsaturated Zone.
Hutzler et al, State of Technology Review Soil Vapor Extraction Systems.
Siemens, A Preliminary Evaluation of an Experimental Program to Remove Volatile Organics from Unsaturated Soils by Vacuum Extraction Feb. 1984.
Shen et al, Air Pollution Aspects of Land Disposal of Toxic Wastes, Feb. 1980.
Ewers, Well Filter for the Extraction of Garbage Diposal, J. F. Nold & Co.

*Primary Examiner*—Dennis L. Taylor
*Attorney, Agent, or Firm*—Miller & Christenbury

[57] ABSTRACT

Decontamination is provided by establishing a borehole into the vadose zone, introducing porous fill material into the borehole, positioning a hollow conduit into the borehole, and applying suction to the conduit and the borehole to reduce pressure and cause air and contaminant vapors to move through the vadose zone and into the borehole and through the porous fill material contained therein.

20 Claims, 4 Drawing Sheets

METHOD OF IN SITU DECONTAMINATION

FIELD OF THE INVENTION

The present invention relates to a method of decontaminating soils, particularly to a method of removing volatile contaminants from unsaturated soils and/or rock.

BACKGROUND OF THE INVENTION

Increasing environmental awareness of contaminated commercial, private and government properties and their potential danger to on-site personnel and surrounding communities has resulted in development of various technologies to attempt to remove and safely dispose of toxic chemical contaminants present in the ground. Some of these technologies have proven to be somewhat applicable in limited situations.

One particular problem of interest relates to contamination of soils by volatile organic compounds which have been released into the ground over a period of time or were accidentally spilled in one or more isolated incidents. In either case, there is frequently a severe danger that the volatile organic compounds will migrate downwardly into the water supply. This can result in direct contamination of groundwater and adjacent fresh water wells or lateral migration into remote wells, surface water or wherein adjacent inhabited surface areas are directly exposed to toxic vapors and/or liquids. The presence and possible movement of these vapors and/or liquids in the ground may also present hazards to occupants of nearby buildings or future buildings to be constructed, or to construction and excavation workers.

Because of the acute toxic dangers presented by these contaminants, it is frequently imperative that the contaminants be promptly, efficiently and effectively removed. However, many constraints often inhibit or prevent removal. For example, if the contaminant(s) has progressed downwardly to a point where excavation of the soils is impossible, the soil must be decontaminated in situ. This restriction eliminates many existing decontamination technologies. Other impediments to decontamination by soil removal and/or soil removal and return subsequent to decontamination include the presence of natural soil formations, such as rock formations, the presence of large buildings, foundations, parking areas, homesites and the like.

DESCRIPTION OF THE PRIOR ART

Several techniques have been developed to decontaminate soils under these and other conditions. However, they are typically limited in their flexibility of use and effectiveness.

For example, Knopik U.S. Pat. No. 4,323,122 discloses a process for recovering organic liquids from underground areas. '122 relates to recovering gasoline lying on top of a water table subsequent to gasoline tank leaks or spills. The method uses a collection head fitted on the insertion end of a conduit connected to an exhaust means and extending downwardly into a borehole. The borehole is sealed around the conduit at the top of the borehole. The exhaust means creates a less than atmospheric pressure in the soil and sucks air and other gaseous materials from the conduit and borehole to permit liquid flow into the collection head to exhaust gasoline vapors but not the liquid.

This process has severe limitations in that it relates to a layer of contaminants floating on the water table. In many cases, the liquid contaminants lie not only on the water table, but are spread throughout the unsaturated soil above the water table. '122 is ineffective in this regard. '122 also includes excavation to permit installation of a subsurface collection head, which tends to be costly and many times is impractical.

Visser et al. U.S. Pat. No. Re. 33,102 also has numerous disadvantages. For example, '102 uses a conduit having a lower perforated portion. Identifying the precise location of the vadose zone and/or the contaminants percolating downwardly therethrough is often a difficult task, especially at lower depths such as 50 to 100 feet or more. Accordingly, it is frequently difficult to determine the length of perforated lower conduit. This is especially true in view of the tendency of the vadose zone to change over time. The result is frequent difficulty in properly matching the length of perforated portion to the depth of the vadose zone and the location of contaminants.

Another disadvantage relates to the increased air resistance presented by use of a perforated lower conduit. Typically, the perforated conduit consists of "well screen" which contains a multiplicity of horizontally oriented, rectangularly shaped, thin slots in the side of the conduit. The pipe material surrounding each slot presents further air resistance to suction applied to the conduit, thereby reducing contaminant removal efficiency. An associated problem with the use of small slots is their frequent tendency to become blocked or clogged by surrounding porous fill material or wet soil.

Still another disadvantage associated with utilizing a conduit with a lower perforated portion is reduced installation and removal efficiencies. This is especially troublesome as the depth of contamination increases. Maintaining the lower perforated portion of the conduit in a central position within a borehole becomes increasingly difficult as depth increases. Aconcentricity of the conduit can result in portions of the perforated pipe lying directly against the side of the borehole, without the benefit of a border of porous fill material. This greatly increases the chance of blocked or clogged slots on one side of the perforated conduit and reduces removal effectiveness on the other side. Also, bridging of the packing material tends to occur as a result of borehole collapse or aconcentricity of the perforated conduit installation. If the packing material is not uniformly placed around the perforated conduit, differential or preferential flow zones tend to be created. This results in nonuniform treatment zones and loss of treatment effectiveness.

Yet another disadvantage of the use of a conduit with a lower perforated portion lies with removal of the system subsequent to final cleanup. Use of a long portion of perforated pipe greatly increases the difficulty of removing the entire conduit since gravel fill material frequently extends into and engages the slots in the lower perforated portion, thereby tending "to lock" the lower perforated portion into place.

Still another disadvantage is the tendency for the perforated portion of the conduit to collect moisture or groundwater during installation and operation. The collected water and sediment is frequently sucked up through the conduit and conveyed to the vacuum system. This is especially true for shallow systems or systems installed in areas of perched water conditions.

3

Another disadvantage is that the perforated conduit create installation difficulties in a system using a shallow borehole design, such as in areas of shallow soil contamination, under building floor slabs or paved areas, working areas with height limitations or system constructed partially or entirely above ground.

OBJECTS OF THE INVENTION

It is an object of the present invention to provide a method of decontaminating soil, capable of use at great depths, which is not subject to blockage of contaminant removal pathways due to difficulties in introducing and maintaining perforated conduit in a central location within boreholes.

It is another object of the present invention to provide a decontamination method using a system capable of removing volatile contaminants from soil which is easily installed and removed at low cost without removing collected water.

It is an important object of the present invention to provide a flexible system of in situ removal of volatile contaminants from soil in varied surface and subsurface conditions such as large buildings, paved areas, rock formations and the like at various depths.

Other objects and advantages of the present invention will become apparent to those skilled in the art from the drawings, the detailed description of preferred embodiments and the appended claims.

SUMMARY OF THE INVENTION

The present invention provides a novel process for removing volatile contaminants from a zone of unsaturated soils. The process includes establishing a borehole into contaminated unsaturated soils and/or rock. A porous fill material surrounds the borehole and is positioned adjacent portions of the unsaturated zone containing the contaminant. One end of the conduit having a solid, air impermeable sidewall is positioned within the borehole, with the conduit having its other end connected to a pump capable of applying suction. The upper portion of the borehole around the conduit is sealed from the atmosphere to prevent atmospheric air from entering the borehole. Suction is then applied to the conduit and borehole to reduce pressure in adjacent portions of the unsaturated zone and cause air and contaminated vapors to flow through the unsaturated zone into the borehole, through porous material in the hole and into the conduit. Suction also creates a liquid-vapor contaminant concentration gradient which can cause vaporization of liquid contaminant and movement of the vapor through the unsaturated zone and into the borehole. Air and contaminated vapors are removed from the borehole and conveyed away for treatment or discharge.

DETAILED DESCRIPTION OF THE INVENTION

It will be appreciated that the following description is intended to refer to the specific embodiments of the invention selected for illustration in the drawings and is not intended to define or to limit the invention, other than in the appended claims.

Figure 1:
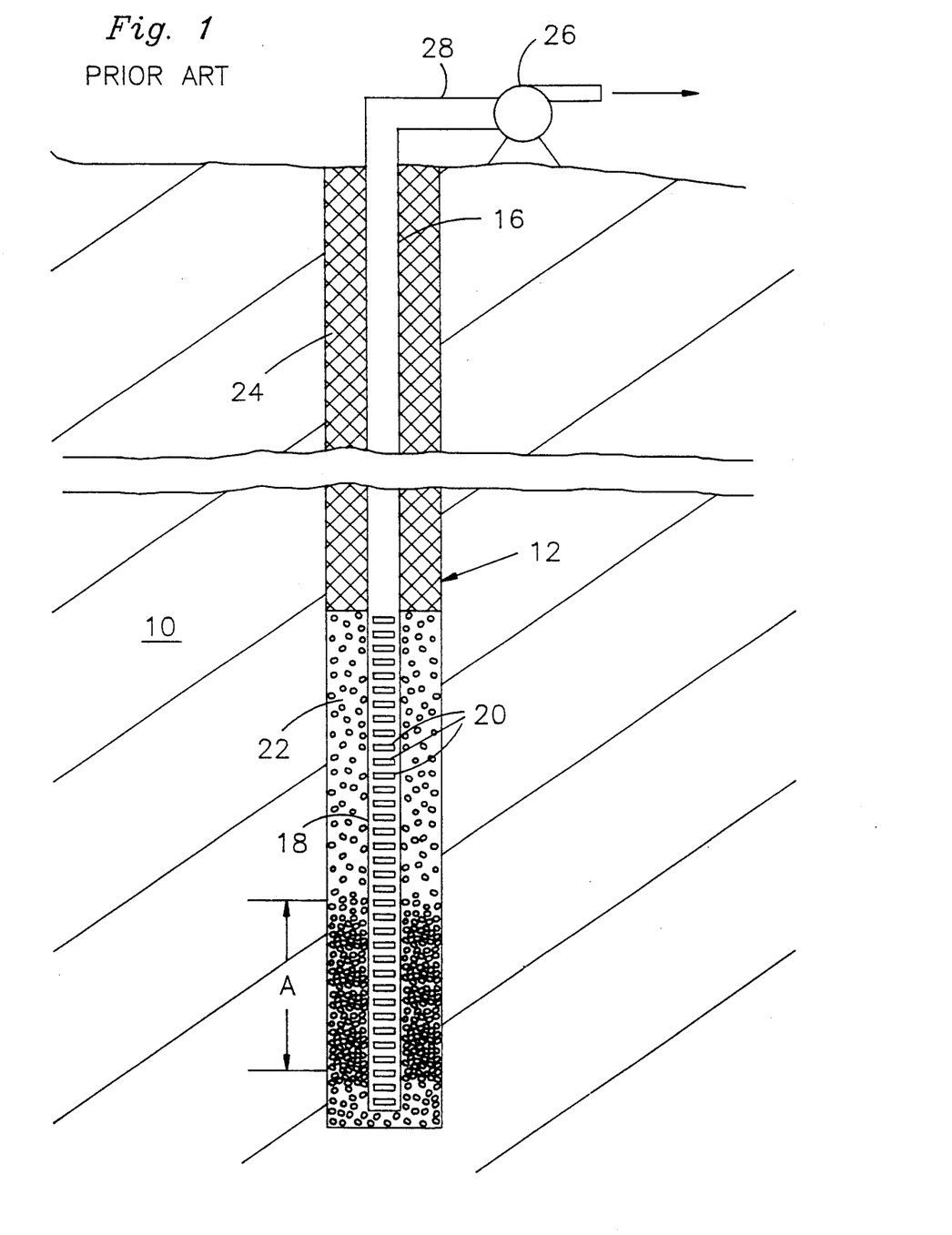
FIG. 1 shows a schematic front elevational cross-section of a prior art system wherein lower perforated portions of a conduit are blocked by fill material.

Turning now to the drawings in general and FIG. 1 in particular, the number 10 designates an unsaturated zone of soil in which a prior art system is installed. Volatile contaminants in liquid and/or vapor phase are located in the unsaturated zone. A borehole 12 is located in unsaturated zone 10 and extends downwardly to a desired location in the vicinity of the volatile contaminants. A conduit 14 is located within borehole 12. Conduit 14 consists of an upper imperforate portion 16 and a lower perforated portion 18. Lower perforated portion 18 has a multiplicity of horizontally oriented slots 20. Porous material 22 is located in a lower portion of borehole 12 and surrounds lower perforated portion 18. Seal material 24 is located in the upper portion of well 12 and surrounds upper imperforate portion 16. Pump 26 is connected to conduit 14 by pipe 28.

The area of porous material 22 bound by the arrows "A" represents an illustrative section wherein porous material is tightly packed against the left side of lower perforated portion 18. The packed gravel obstructs or blocks holes similar to holes 20 located on the side of the conduit.

Figure 2:
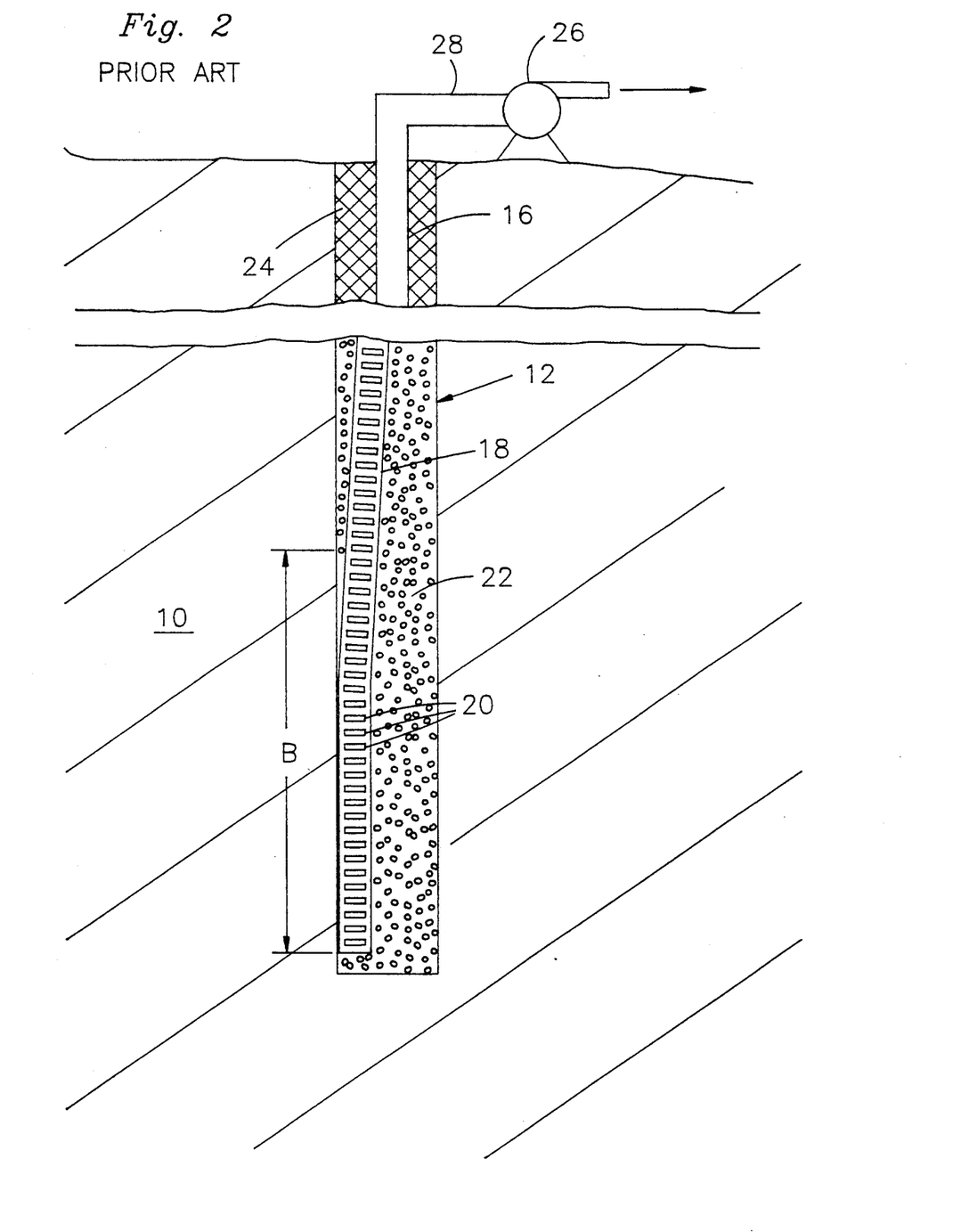
FIG. 2 shows a schematic front elevational cross-section of a prior art system having a skewed, out of center lower perforated conduit portion.

The system shown in FIG. 2 is similar to that shown in FIG. 1 except that conduit 14 is skewed "out of center" with respect to borehole 12. Seal material 24 surrounds upper imperforate portion 16, but porous material 22 only partially surrounds lower perforated portion 18. Specifically, the portion of conduit 14 located between the arrows "B" is only partially surrounded by gravel. A portion of lower perforated portion 18 lies substantially directly against the sidewall of borehole 12, namely directly against the soil, and is free of surrounding porous material 22.

Figure 3:
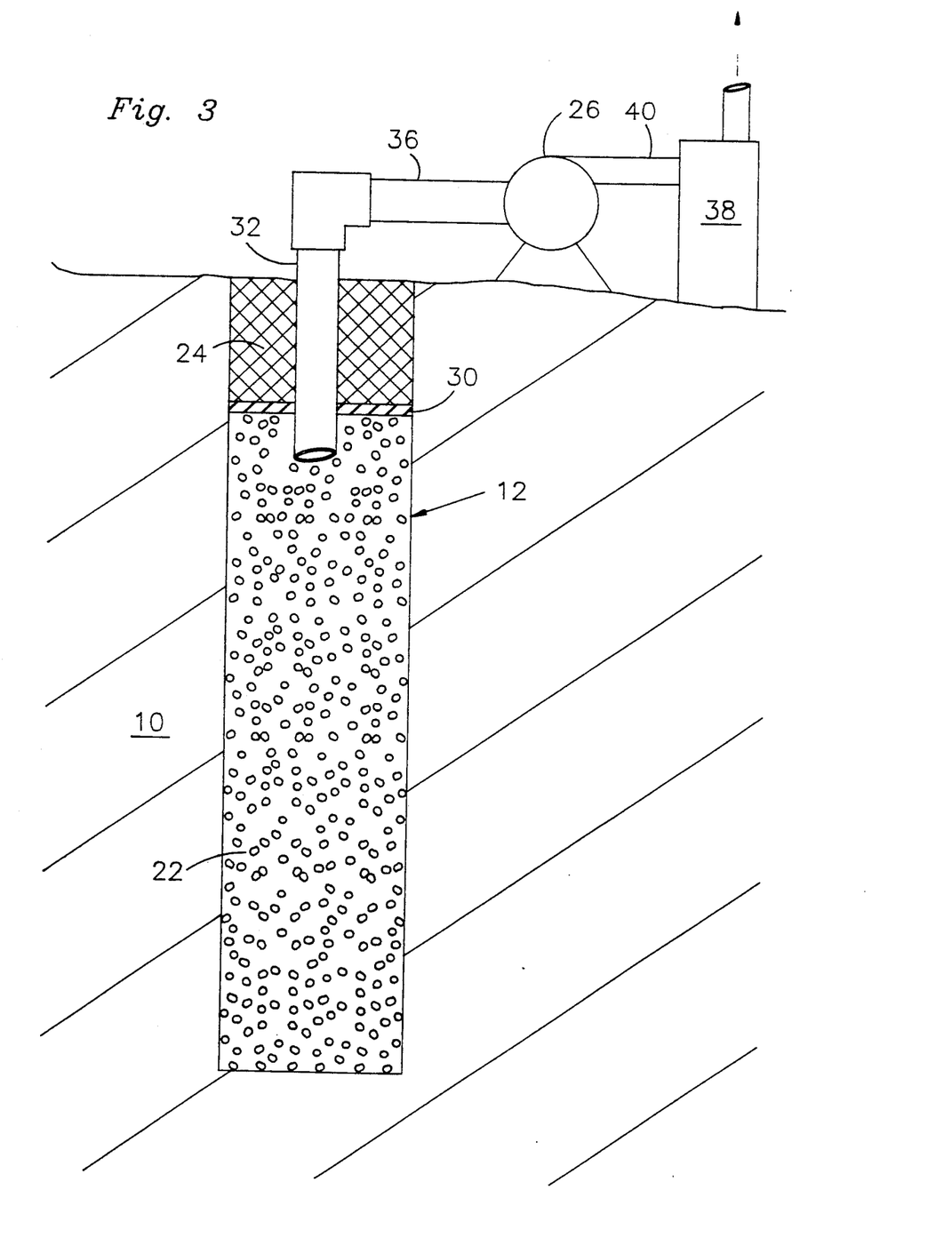
FIG. 3 shows a schematic, front elevational cross-section of a system in accordance with aspects of the invention.

FIG. 3 shows a system used in accordance with one embodiment of the method of the invention. Borehole 12 is located in unsaturated zone 10. Borehole 12 has its lower portion filled with porous material 22 and an upper portion filled with seal material 24. Porous material 22 and seal material 24 are separated by donut 30. Solid wall, air impermeable conduit 32 extends vertically downwardly through seal material 24 and has its lower end extending through donut 30 and into the upper portion of the porous material. Donut 30 is a round plate having a centrally positioned hole which receives the lower end of conduit 32. The upper end of conduit 32 extends above ground and connects to pump 26 by exhaust pipe 36 which in turn connects to emission treatment unit 38 by way of exhaust pipe 40.

Figure 4:
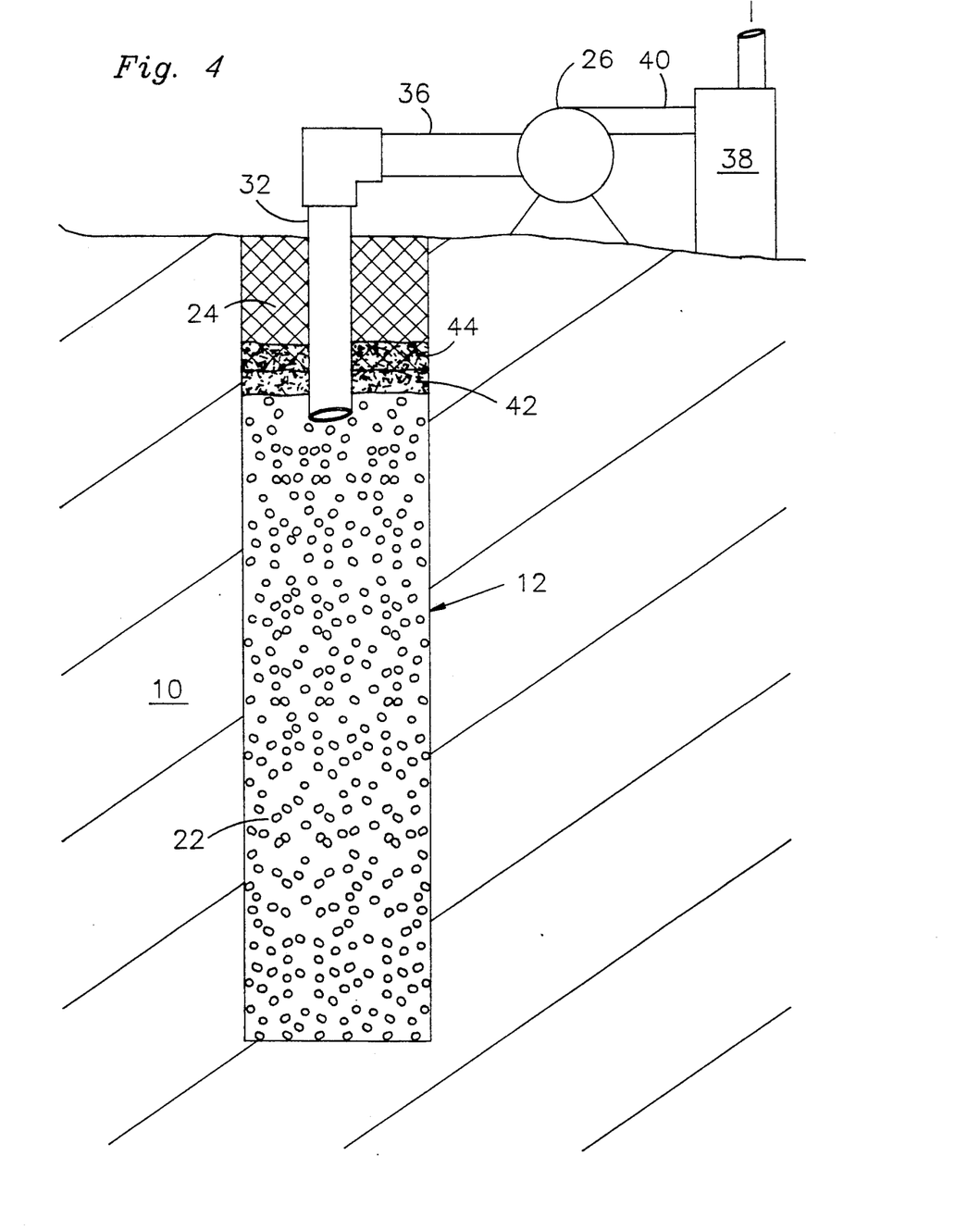
FIG. 4 shows a schematic, front elevational side section of another system in accordance with the invention.

FIG. 4 shows an alternate embodiment of a system which may be used in the method of the invention having similarities to the embodiment shown in FIG. 3. The primary difference lies with replacement of donut 30 from FIG. 3 with a layered intermediate construction. In particular, a layer of granular material 42 such as sand is located over porous gravel 22. A further upper layer of a mixture 44 of seal material 24 and granular material 42 is positioned on top of a granular layer 42.

Installation and operation of the system of the invention will now be described below. Once a spill or release of volatile liquid contaminant(s) has been identified, it is necessary to determine the area of downward progression and/or migration of the contaminant(s). Location of this progression is achieved through ordinary methods well known to those of ordinary skill in the art and is not discussed herein. After contaminant location has been determined, it is necessary to determine the location and number of boreholes necessary to remove the contaminant. This procedure is also well known.

It is important that each borehole be located at depths capable of receiving liquid contaminant and/or contaminant vapors. Thus, borehole depth should be at least as deep as the contaminated unsaturated zone to maximize contaminant removal efficiency. In prior art systems, such as that illustrated in FIG. 1, a precise length of lower perforated portion 18 should be selected to ensure optimum removal conditions. This is frequently a difficult task since the area of contamination frequently changes over time. The change in area can result from the characteristics of the contaminant itself and/or rising and lowering of the water table and its influence on the unsaturated zone. Changing water levels or the presence of perched water conditions can result in collected water in the perforated portion of the conduit in prior art systems, thereby risking damage to the pump system, lowered removal efficiencies, freeze up during cold weather operation, and reduced efficiency of air treatment systems.

Once the area of decontamination has been identified, one or more boreholes are sunk into the contaminated unsaturated zone and gravel or porous material 22 is introduced into the portion of the borehole 12 adjacent the contaminated unsaturated zone. The construction of the system used with the method of the invention eliminates the uncertainty associated with precisely determining the exact length of perforated pipe needed to match the contaminated area, depth to the water table, and use in perched water areas. Then, the solid wall, air impermeable conduit 32 is introduced into the upper portion of borehole 12.

The conduit 32 may be connected to donut 30 as shown in FIG. 3 of the drawings. Donut 30 may be connected in any number of ways such as with screws, welds, glue and the like. Also, donut 30 need not be physically connected at all.

In the alternative, the layer of granular material 42, as shown in FIG. 4 of the drawings, may be introduced on top of the porous gravel material 22 and then a mixture 44 of seal material 24 and granular material 42 is introduced over granular layer 42. Seal material 24 is then introduced on top of mixture 44. Seal material 24 creates an air impermeable barrier preventing air from being drawn down through the upper portion of borehole 12. When a donut 30 is used, seal material 24 is simply introduced on top of donut 30 and allowed to solidify in the same manner.

Conduit 32 is then connected to an air/vapor withdrawal system which includes exhaust pipe 36, pump 26, exhaust pipe 40 and emission treatment unit 38.

Pump 26 is actuated to lower the pressure in the lower portion of borehole 12 in the vicinity of porous material 22. Pump 26 may be of any type known to those of ordinary skill in the art. Such a pump 26 typically is a 10 to 40 horsepower electric motor or fuel fired engine capable of providing reduced pressure in borehole 12, typically to between about 0.5 to about 0.99 atmospheres. Pump 26 lowers the pressure in the lower portion of borehole 12, which causes air and liquids in the soil to flow toward borehole 12 and into porous material 22. Preexisting contaminant vapors occupying spaces in the unsaturated zone are also drawn toward borehole 12 and into porous material 22. Liquid contaminant can then vaporize due to a contaminant concentration gradient created by removal of existing vapors. Liquid contaminant vaporizes in an attempt to reestablish the natural contaminant liquid-vapor equilibrium in the soil. These vapors are then drawn toward borehole 12 and into porous material 22.

Air, contaminant vapors and water vapor (created by evaporation of moisture in the soil) received into the lower portion of borehole 12, move through porous material 22 and into the lower end of solid wall, air impermeable conduit 32 and lifted upwardly to ground surface. Water vapor, if present, may be separated from the mixture of air and contaminant vapor by a water vapor trap. One advantage associated with separation of water vapor from the air and contaminant vapor mixture is an increase in pump life and an increase in the efficiency of the air treatment system. Other means of water vapor separation may be utilized.

After water vapor separation, air and contaminant vapors are channeled to emission treatment unit 38, which may be of any type well known in the art. An especially preferred treatment unit is a carbon adsorption separator wherein contaminants are retained in the carbon separator and clean air is exhausted to the atmosphere. Other means of separating air from the contaminant vapors may be used, such as catalytic oxidizers, condensers, scrubbers, incinerators and the like.

It should be understood that a wide variety of porous materials 22 may be used in accordance with the invention so long as they are capable of permitting air and vapors to flow to conduit 32. Such materials can include gravel of various sizes, for example. Pea gravel is especially preferred. Similarly, many seal materials 24 may be used so long as they are substantially impermeable to passage of air. Bentonite, grouts, clayey soil, cements and the like are preferred.

The material used for conduit 32 is not critical so long as it is air impermeable and corrosion resistant. Selection of an appropriate material is typically influenced by the type of contaminant to be removed. For example, certain organic compounds tend to dissolve certain types of plastic pipes. However, PVC pipe has proven effective. Donut 30 may also be made from a variety of rigid or flexible materials such as plastics, wood, metal and the like.

The length of conduit 32 extending into borehole 12 is also not critical to the invention so long as air impermeability is not compromised. For example, conduit 32 need not extend throughout the length of seal material 24 so long as seal material 24 is sufficiently air impermeable to prevent escape of vapors into the surrounding atmosphere and entry of atmospheric air into borehole 12. In fact, conduit 32 need not extend below ground surface so long as the seal is maintained. Similarly, it is permissible for conduit 32 to extend downwardly beyond seal material 24 and into gravel 22.

Use of a solid wall, air impermeable conduit which does not extend throughout the length of the unsaturated contaminated zone avoids the problems associated with prior art systems and processes. The lack of a long perforated lower portion of conduit greatly reduces the chances of clogged or blocked slots or holes in the perforated portion. It also resolves the problems associated with borehole collapse and bridging of packing material resulting in loss of treatment effectiveness. This ensures application of lowered pressure in an even fashion to the lower portion of borehole 12. Also, air resistance is substantially reduced by eliminating the presence of the lower perforated portion. This improves the efficiency of maintaining lowered pressures throughout the depth of the gravel filled portion of borehole 12. This phenomenon is quite surprising since it was previously believed that the presence of the perforated lower portion of the conduit created a completely open central bore through the porous material, down to the bottom of borehole 12, which ensured nearly equal application of lowered pressure throughout the depth of the lower portion of borehole 12.

The lack of utilization of a long lower perforated portion increases the ease with which the entire system may be installed and removed. For example, installation costs have been reduced by nearly a factor of ten over prior systems using perforated conduit. In instances where borehole 12 extends deeper into the unsaturated zone, such as 50 or 100 feet or more, it is difficult to maintain concentricity of conduit 32 within the borehole. This problem is especially magnified when the diameter of the borehole is less than 12 inches, which is typical. This troublesome problem is eliminated by the method of the invention which avoids a long perforated conduit. The problems associated with having skewed or aconcentric long lower perforated portions, namely clogging or blocking of perforations or slots, has also been eliminated. The invention also avoids the problems associated with collection of excess water and groundwater into the pump and air treatment systems.

The method is applicable to a wide variety of contaminants such as gasoline, kerosene, aviation and other hydrocarbon fuels, benzene, methyl ethyl ketone, mineral spirits, propane, FREON, acetone, alcohols, carbon tetrachloride, trichlorobenzene, tetrachlorobenzene, tetrachlorophenol, chlorophenol, dichlorobenzene, dichlorostyrene, various pesticides, mixtures of the above and many other volatile compounds, especially volatile organic compounds.

Although this invention has been described in connection with the specific forms thereof, it will be appreciated that a wide array of equivalents may be substituted for the specific elements shown and described herein, and that a wide array of equivalents may be substituted for the specific steps described herein without the departing from the spirit and scope of this invention as described in the appended claims.

For example, boreholes may be excavated at various angles out of vertical to reach difficult locations under buildings, roads and parking areas. Boreholes do not need to be cylindrically shaped as shown in the drawings. The boreholes may have any shape of cross-section, such as square or rectangular instead of circular. A rectangular shape cross-section may be achieved by use of a trench type construction. Similarly, the donut need not be round and need not be flat or plate like.

The method may be employed in a variety of soil conditions such as sand, clay, top soil, land fill, waste material, limestone, porous or fractured rock, combinations thereof and the like. The method may also be employed inside structures and through floors in those structures.

The method may further include application of more than one conduits per hole. In this manner, two or three or more conduits may extend to different depths in order to clean several contaminated unsaturated zones. The construction of such a system includes an initial seal material section at a first uppermost portion of the hole, followed by a first porous section wherein a first conduit terminates. Remaining conduit(s) extend through the first uppermost sealed portion, through the first porous section and into a second seal material section. The remaining conduit(s) extend through the second seal material section and into a second porous section. A conduit terminates at the top of the second porous section while an remaining conduit continues in a like manner to still other seal material section(s) and porous material section(s).

We claim:

1. A process for removing contaminant from a vadose zone comprising the steps of:
   establishing a borehole at a desired angle into the vadose zone;
   introducing a porous fill material into the borehole and positioning the fill material adjacent to portions of the vadose zone containing the contaminant;
   positioning one end of a hollow conduit having a solid air impermeable side wall adapted for ease of installation and removal, subsequent to removal of the contaminant, into the borehole and adjacent to but not through an upper portion of the contaminant in the vadose zone, the conduit having its other end connected to pump means capable of applying suction to the conduit;
   sealing an upper portion of the borehole around the conduit from the atmosphere;
   applying suction to the conduit and the borehole to reduce pressure in a portion of the vadose zone and cause 1) air and contaminant vapors to move through the vadose zone and into the borehole and 2) creation of a liquid-vapor contaminant concentration gradient to facilitate vaporization of liquid contaminant and movement of the vapor through the vadose zone into the borehole; and
   removing air and contaminant vapors which are substantially free of liquids through at least a portion of the porous fill material and from the borehole.

2. The process defined in claim 1 wherein the porous fill material is gravel.

3. The process defined in claim 1 wherein the step of sealing the borehole comprises introducing a nonporous, air impermeable material into an upper portion of the borehole and around the conduit.

4. The process defined in claim 3 further comprising placing a blocking member on top of the porous fill material prior to introducing the nonporous, air impermeable material into the borehole.

5. The process defined in claim 4 wherein the blocking member is a substantially flat plate with a central hole sized to closely receive the conduit and being shaped and dimensioned to closely fit along the side of the borehole.

6. The process defined in claim 4 wherein the blocking member comprises a lower layer of packed granular material and an upper layer of a mixture of granular material and the nonporous, air impermeable material.

7. The process defined in claim 1 further comprising separating water vapor from air and contaminant vapors at a point along the conduit.

8. The process defined in claim 1 further comprising adsorbing the contaminant vapors with carbon.

9. The process defined in claim 1 further comprising injecting air or providing passive air inlet points into the vadose zone at one of more remote locations to promote air and vapor movement within the vadose zone.

10. The process defined in claim 1 further comprising treating the contaminant vapors within a catalytic oxidizer.

11. The process defined in claim 1 wherein the lower end of the hollow conduit is located above the porous fill material.

12. A method of removing one or more volatile contaminant from an unsaturated zone comprising:
   evacuating a hole at a desired angle to a desired depth;
   inserting one end of a solid wall, air impermeable hollow pipe adapted for ease of installation and removal, subsequent to removal of the contaminant into the hole to a desired depth and to a depth adjacent to an upper portion of the contaminant in the unsaturated zone or above the contaminant in the unsaturated zone;
   filling at least a portion of the hole with an air permeable fill material;
   establishing a substantially airtight seal around the pipe at an upper portion of the hole;
   creating a reduced pressure atmosphere in the pipe and the hole to cause air and vapor phase contaminant to flow into the hole and the pipe; and
   removing air and the vapor phase contaminant which is substantially free of liquid phase water or contaminant through at least a portion of the air permeable fill material and from the hole.

13. The method defined in claim 12 wherein the lower end of the pipe is above the bottom of the borehole, and wherein at least some of the fill material is located below said lower end of said pipe.

14. The method defined in claim 12 wherein the step of creating a reduced pressure atmosphere causes liquid phase contaminant to vaporize as a result of a liquid-vapor contaminant and flow into the hole and the pipe.

15. A method of removing volatile contaminant from an unsaturated zone comprising:
   opening a hole at a desired angle into the unsaturated zone;
   positioning an end of a solid wall, air impermeable hollow pipe adapted for ease for installation and removal subsequent to removal of the contaminant, into the hole and adjacent to or above the contaminant in the unsaturated zone and to but not extending through the contaminant in the unsaturated zone air permeable fill material;
   establishing an airtight seal around the pipe at the hole;
   reducing the pressure in the pipe and the hole to cause air and contaminant vapors to flow into the hole and through the air permeable material; and
   removing air and contaminant vapors substantially free of liquids from the hole through at least part of the air permeable fill material and the pipe.

16. The method defined in claim 15 wherein the step of reducing the pressure in the pipe facilitates i) liquid contaminant vaporization by creating a concentration gradient in the unsaturated zone and ii) flow into the hole, through the air permeable material and into the pipe.

17. The method defined in claim 15 further comprising treating the contaminant vapors with a catalytic oxidizer.

18. A process for removing contaminants from a vadose zone comprising the steps of:
   establishing a borehole at a desired angle into the vadose zone;
   introducing a porous fill material into the borehole and positioning the fill material adjacent to portions of the vadose zone containing the contaminant;
   positioning one end of a hollow conduit having a solid, air impermeable side wall adapted for ease of installation and removal, subsequent to removal of the contaminant, into the borehole to a depth no lower than an upper portion of the vadose zone containing the contaminant, the conduit having its other end connected to pump means capable of applying suction to the conduit;
   sealing an upper portion of the borehole around the conduit from the atmosphere;
   applying suction to the conduit and the borehole to create lowered pressure along the depth of the borehole to reduce pressure in portions of the vadose zone adjacent to the borehole and cause (1) air and contaminant vapors to move through the vadose zone and into the borehole and (2) creation of a liquid-vapor contaminant concentration gradient to facilitated vaporization of liquid contaminant and movement of the vapor through the vadose zone into the borehole; and
   removing air and contaminant vapors substantially free of water or contaminant in liquid form through at least a portion of the porous fill material and from the borehole.

19. A method of removing volatile contaminant from an unsaturated zone comprising:
   opening a hole at a desired angle into the unsaturated zone;
   positioning an end of a solid wall, air impermeable hollow pipe adapted for ease of installation and removal, subsequent to removal of the contaminant into the hole and to a depth no lower than an upper portion of the unsaturated zone containing the contaminant and air permeable fill material in the hole;
   establishing an airtight seal around the pipe at the hole;
   reducing the pressure in the pipe and the hole to create lowered pressure along the depth of the hole, thereby causing air and contaminant vapors to flow into the hole from portions of the unsaturated zone adjacent to the hole and through the air permeable fill material; and
   removing air and contaminant vapors substantially free of liquid water or liquid contaminant from the hole through at least a portion of the air permeable fill material and the pipe.

20. A method of removing volatile contaminant from an unsaturated zone comprising:
   opening a hole at a desired angle into the unsaturated zone;
   establishing an airtight seal between the hole and a solid wall, air impermeable hollow pipe adapted for ease of removal, subsequent to removal of the contaminant, and located at the hole, the pipe extending toward or into the hole to a depth no lower than an upper portion of the contaminant;
   reducing the pressure in the pipe and the hole to cause air and contaminant vapors to flow into the hole; and
   removing air and contaminant vapors substantially free of liquids from the hole.

* * * * *

UNITED STATES PATENT AND TRADEMARK OFFICE
CERTIFICATE OF CORRECTION

PATENT NO.   : 5,106,232
DATED        : April 21, 1992
INVENTOR(S)  : Nancy Metzer et al It is certified that error appears in the above-identified patent and that said Letters Patent is hereby corrected as shown below:

In Column 9, Lines 46 and 47, move the following "or above the contaminant in the unsaturated zone and to" to Line 49, before "air".

In Column 9, line 44, "for" should read -- of --

Signed and Sealed this

Fifteenth Day of June, 1993

Attest:

MICHAEL K. KIRK

Attesting Officer

Acting Commissioner of Patents and Trademarks